United States Patent Office 2,915,409
Patented Dec. 1, 1959

2,915,409

PROCESS FOR PRODUCING CELLULAR INSULATING MATERIALS

William C. Taylor, Toledo, Ohio, assignor, by mesne assignments, to Owens-Corning Fiberglas Corporation, a corporation of Delaware No Drawing. Application November 7, 1956
Serial No. 620,795

6 Claims. (Cl. 106—86)

This invention relates in general to a process for producing thermal insulating materials, and more particularly to a process for producing cellular-type thermal insulating materials.

In the manufacture of light density cellular-type thermal insulating materials, such as cellular concrete and the like, it has been customary to form an aqueous slurry of reactive cementitious materials and then to foam the slurry by introducing therein either a pre-formed foam or a liquid capable of producing a foam when subjected to violent agitation. However, the relatively unstable nature of the foams presently utilized causes a breakdown and collapse of the foam when it is subjected to temperatures generally in excess of about 110°–150° F. Hence, regardless of which of the aforementioned types of foaming processes is utilized, it is necessary to maintain the slurry at temperatures generally not exceeding 110°–150° F. until the slurry has attained sufficient rigidity to retain its cellular structure independently of the foam. However, once the foamed slurry has rigidified, or pre-hardened, to such an extent that it is no longer dependent upon the foam for the retention of its cellular structure, the slurry reaction may be accelerated and carried to completion by subjecting the slurry to superatmospheric steam pressures under conventional autoclaving procedures.

Obviously, the above-described foaming processes cannot be utilized with those types of slurries that are not sufficiently reactive to indurate, or harden, into self-supporting structures at temperatures below the critical foam breakdown temperatures indicated. Well-known examples of such types of slurries are the lime-silica-water type slurries from which light apparent density hydrous calcium silicate insulating materials are produced, and which require heat and pressure, as by autoclaving under the influence of superatmospheric steam, in order to undergo any appreciable induration.

Accordingly, it is a principal object of this invention to provide an improved process by which cellular-type hydrous calcium silicate materials and the like may be produced by direct autoclaving procedures similar in nature to those currently utilized for the production of non-cellular hydrous calcium silicate materials.

Another object of the present invention is to provide a simple and economical process for the manufacture of cellular-type hydrous calcium silicate materials and the like.

A particular object of the present invention is to provide a process for manufacturing cellular-type hydrous silicate insulating materials from aqueous slurries of cementitious reactants, which is characterized by the introduction of a slurry-insoluble liquid into the unreacted slurry, and subsequently simultaneously reacting the slurry and vaporizing the liquid under the influence of heat.

Other objects and advantages will become apparent from the following detailed description.

In the production of light apparent density cellular-type hydrous silicate insulating materials, such as hydrous calcium silicates and the like, according to the present invention, a water insoluble liquid, which when heated, will vaporize and yield small bubbles or globules, is introduced into an aqueous slurry consisting of reactive cementitious materials, which, when reacted, entrap the liquid globules and combine to form a light-weight consolidated cellular body having a myriad of substantially disconnected cells disposed throughout, which impart to the body excellent thermal insulating characteristics.

The liquid which is introduced into the slurry must, however, possess certain fundamental properties in order that the ultimate reacted product will have embodied therein independently formed and disconnected cells distributed homogeneously throughout. Primarily, the liquid selected must be one which is insoluble in the aqueous slurry. Secondly, the liquid must be one having a vapor pressure only slightly greater than the vapor pressure of the water of the slurry when heated to a temperature sufficient to react the slurry ingredients into a semi-rigid or gelatinous structure. Thirdly, the liquid must be inert with respect to the slurry ingredients.

One such liquid possessing these requisite properties, and which has been successfully employed in the practice of this invention, is normal-heptane, which exhibits a vapor pressure of 760 mm. at 98.4° C., and which has a vapor pressure slightly exceeding the vapor pressure of the slurry water, up to a temperature of approximately 107° C., and above which approximate temperature the vapor pressure of the slurry water exceeds that of the normal-heptane.

In accordance with the principles of this invention, a liquid, having the aforementioned properties, such as normal-heptane, is homogeneously dispersed throughout the aqueous slurry by a method to be subsequently described. The liquid-slurry mixture is then partially reacted into a thick gelatinous mass under the influence of heat and pressure, which is preferably supplied by conventional steam autoclaving procedures. By subjecting the liquid-slurry mixture to a steam pressure, which is intermediate the vapor pressure of the slurry and that of the liquid during the slurry thickening process, the liquid is caused to gradually vaporize independently of the slurry, while the slurry is being converted into a thick gelatinous mass of sufficient consistency to entrap the liquid vapors as they are formed. These liquid vapors are entrapped by the slurry in the form of tiny, independent, gaseous globules which provide the final indurated product with a representative cellular structure.

The selection of a liquid, such as normal-heptane, which vaporizes during the thickening, or gelation of the slurry imposes a critical limitation upon this process. For example, if a liquid is utilized which prematurely vaporizes, as by vaporizing before the slurry has thickened sufficiently to entrap the liquid vapors, the vapors will be permitted to escape from the slurry. On the other hand, if a liquid is utilized which does not vaporize until after the slurry has attained a substantial degree of rigidity, so that it is incapable of yielding sufficiently to accommodate the expanding liquid vapors, the hardened slurry will be ruptured or laminated. Hence, it is necessary that the liquid selected have a vapor pressure which will permit the liquid to be vaporized concurrently with the thickening, or gelation, of the slurry and at a temperature-pressure relationship which will not permit ebullition of the slurry itself. Obviously, in order for the liquid to possess such a property, it is also necessary that the liquid be insoluble in the slurry, in order that it may exert a vapor pressure independent of the vapor pressure of the slurry, and, additionally, that the liquid must not react with the slurry ingredients.

In order that the slurry-insoluble liquid may be homogeneously dispersed throughout the slurry, as prescribed, it is necessary to provide a carrier for the liquid. Such a carrier preferably is one which may be prepared in comminuted form, is insoluble in the slurry, and will absorb both the liquid and the slurry. An example of such a carrier, found to be quite suitable for this purpose, is ordinary wood flour. By impregnating the wood flour with the liquid, and then thoroughly dispersing the impregnated wood flour throughout the slurry, a homogeneous suspension of the liquid within the slurry may be obtained.

Two specific examples of a process carried out in the above described manner for the production of hydrous cellular calcium silicate thermal insulating bodies are hereinafter described.

Example 1

An aqueous slurry, having a lime/quartz weight ratio of 0.95 and a water/solids weight ratio of 1.17, was prepared. Into 750 ml. of this slurry, there was homogeneously dispersed 10 gms. of wood flour, impregnated with 15 gms. of normal-heptane. The heptane-slurry mixture was then poured into a pan mold and immediately placed in an autoclave, in which it was gradually heated with saturated steam. The steam within the autoclave was gradually brought up to a pressure of 25 p.s.i.g., at which pressure the steam was then maintained for 1¼ hours. The rate at which the steam pressure was increased was closely regulated so that the normal-heptane, which, at the same corresponding temperature, exhibits a vapor pressure slightly greater than that of the slurry water or saturated steam up to a temperature of about 107° C., was permitted to attain a temperature sufficient to cause the normal-heptane to vaporize even while being subjected to the pressure of the steam. This is a very important step in the process since if the steam pressure is raised too rapidly, the temperature, and hence the vapor pressure of the normal-heptane, may lag behind the steam pressure to such an extent that vaporization of the normal-heptane would not occur. Following the initial autoclaving at 25 p.s.i.g., the steam pressure was increased to 225 p.s.i.g. and maintained for 4 hours to further indurate the slurry. The product obtained by this process contained a myriad of spherical voids, homogeneously dispersed throughout the structure, and, upon drying at 350° F., possessed an apparent density of 22 p.c.f.

Example 2

An aqueous slurry having a lime/quartz weight ratio of 0.95, and a water/solids weight ratio of 1.2, was prepared. Into 1500 ml. of this slurry, there was homogeneously dispersed 10 gms. of wood flour impregnated with 15 gms. of normal-heptane. This slurry was given the same autoclaving as that indicated in Example 1. The autoclaved product obtained in this instance possessed an excellent cellular structure, and, since the ratio of slurry to heptane was higher in this case than in the first example, a higher density product was obtained, which had an apparent dry density of 32.6 p.c.f.

As indicated in the above two examples, the steam pressure initially was gradually raised to 25 p.s.i.g. within the autoclave. This gradual rise in steam pressure, and consequent steam temperature, permitted the slurry to gradually react and thicken concurrently with the vaporization of the normal-heptane, the vaporization of the normal-heptane primarily occurring within the temperature range of 98.4° to 107° C., through which range the vapor pressure of the heptane exceeds the pressure of the steam. After autoclaving the slurry for 1¼ hours at a steam pressure of 25 p.s.i.g., the reaction had progressed to a point where the slurry was sufficiently hardened to permit the lime/quartz reaction to be accelerated by increasing the steam pressure from 25 p.s.i.g. to 225 p.s.i.g. The resultant indurated product was removed from the autoclave in the form of a light apparent density cellular insulating material which, after drying, possessed excellent structural insulating characteristics.

Among the many apparent advantages arising from this improved process is the attainment of a simple process which may be beneficially employed to produce in cellular form most types of light density commercial insulating materials such as are presently prepared from aqueous slurries. Furthermore, the present process effectively eliminates the necessity of utilizing pre-formed foams or foam-producing liquids, and consequently eliminates the necessity of pre-hardening the foamed slurries into self-supporting structures at temperatures below 110°–150° C., prior to autoclaving. The elimination of this pre-hardening operation necessarily results in a substantial reduction in the processing time.

Additionally, the present process may be employed to produce light density cellular thermal insulating materials, such as hydrous calcium silicate materials and the like, which have not heretofore been commercially available in cellular form. As distinguished from the cellular form in which these hydrous calcium silicate materials may now be produced by the present process, they have, heretofore, customarily been formed with a characteristic micro-porous structure consisting of a maze of interconnected sub-microscopic passages, or capillaries, extending throughout the structure. Such capillaries offer very little resistance to water transmission through the structure, whereas the cellular structure obtainable with the present invention provides a myriad of independent and disconnected spherical voids which do not act as capillaries, but rather as separate and distinct cells, which consequently provide substantially improved moisture resistance to the insulating material.

It will, of course, be understood that the various details of the above-described process may be modified throughout a wide range, and it is, therefore, not the purpose to limit the scope of the appended claims.

I claim:

1. In the manufacture of cellular thermal insulation from a slurry having a finely divided and reactive solids content consisting essentially of silica and an alkaline earth metal oxide present in proportions sufficient to react and form a thick gelatinous mass at temperatures of about 98° C.–107° C., the method which comprises: dispersing throughout said slurry an absorbent slurry-insoluble and chemically inert carrier impregnated with a slurry-insoluble liquid, said slurry-insoluble liquid being chemically inert with respect to said slurry and having a vapor pressure slightly greater than saturated steam within the temperature range of approximately 98° C.–107° C., but not greater than that of saturated steam at temperatures in excess of approximately 107° C.; reacting said dispersion to a semi-solid shape retaining condition while concurrently vaporizing said slurry-insoluble liquid to form a cellular body containing a myriad of independent and unconnected cells of substantially uniform size by heating said dispersion to a temperature within the temperature range of approximately 98° C.–107° C. under a pressure less than the vapor pressure of said slurry-insoluble liquid, but not less than the vapor pressure of said slurry.

2. In the manufacture of cellular thermal insulation from a slurry having a finely divided and reactive solids content consisting essentially of silica and an alkaline earth metal oxide present in proportions sufficient to react and form a thick gelatinous mass at temperatures within the temperature range of approximately 98° C.–107° C., the method which comprises: dispersing throughout said slurry an absorbent slurry-insoluble and chemically inert carrier impregnated with a slurry-insoluble liquid, said slurry-insoluble liquid being chemically inert with respect to said slurry and having a vapor pressure slightly greater than saturated steam within the temperature range of approximately 98° C.–107° C., but not greater than that of saturated steam at temperatures in excess of approximately 107° C.; reacting said dispersion and concurrently vaporizing said slurry-insoluble liquid to form a cellular body containing a myriad of independent and unconnected cells of substantially uniform size by heating said dispersion with steam to a temperature within the temperature range of approximately 98° C.–107° C. under a pressure slightly less than the vapor pressure of said slurry-insoluble liquid, but not less than the vapor pressure of said slurry; and curing said dispersion at a temperature substantially in excess of 107° C.

3. In the manufacture of cellular thermal insulation from a slurry having a finely divided and reactive solids content consisting essentially of silica and an alkaline earth metal oxide present in sufficient proportions to react and form a thick gelatinous mass at temperatures within the temperature range of approximately 98° C.–107° C., the method which comprises: preparing a slurry of such insulation-forming ingredients; homogeneously dispersing throughout said slurry an absorbent slurry-insoluble chemically inert carrier impregnated with a slurry-insoluble liquid chemically inert with respect to said slurry and having a vapor pressure slightly greater than saturated steam at temperatures within the temperature range of approximately 98° C.–107° C., but not greater than that of saturated steam at temperatures in excess of approximately 107° C.; heating the dispersion with saturated steam within a closed chamber while gradually increasing the pressure of said steam within said chamber up to about 25 p.s.i.g. pressure; continuing heating said dispersion with said steam at a pressure of about 25 p.s.i.g. for sufficient time to react said insulation forming ingredients to a semi-solid self supporting body; and curing said dispersion with said steam at a steam pressure substantially in excess of about 25 p.s.i.g. pressure.

4. A process for producing a light density cellular thermal insulating material, which comprises the steps of: preparing an aqueous slurry having a finely divided and reactive solids content consisting essentially of about equal quantities of lime and silica and having a water/solids weight ratio of approximately 1.2; impregnating an absorbent slurry-insoluble and chemically inert carrier consisting of finely divided wood flour with normal-heptane; dispersing the impregnated wood flour homogeneously throughout said slurry; reacting said slurry ingredients to form a semi-solid self supporting body and concurrently vaporizing said normal-heptane by heating the dispersion with saturated steam within a closed chamber to a temperature in the temperature range of approximately 98° C.–107° C.

5. A process for producing a light density cellular thermal insulating material, which comprises the steps of: preparing an aqueous slurry having a finely divided and reactive solids content consisting essentially of about equal quantities of lime and silica and having a water/solids weight ratio of approximately 1.2; impregnating a slurry-insoluble and chemically inert carrier consisting of finely divided wood flour with normal-heptane, the weight ratio of wood flour/normal-heptane being approximately 0.67; dispersing the impregnated wood flour homogeneously throughout said slurry in an amount sufficient to form a dispersion having a concentration in the range of approximately 0.17–0.33 gram of impregnated wood flour per milliliter of slurry; reacting said slurry ingredients to form a semi-solid self supporting body and concurrently vaporizing said normal-heptane within the temperature range of approximately 98° C.–107° C. by heating the dispersion with saturated steam within a closed chamber while gradually increasing the steam pressure within said chamber to about 25 p.s.i.g. pressure.

6. In the method of producing cellular thermal insulation from a slurry having a solids content consisting of a highly reactive alkaline earth metal oxide and silica in finely divided form, the said alkaline earth metal oxide and silica being present within the molecular range of from .9:1 to 1:1, said method including the steps of preparing the alkaline earth metal oxide and silica in the form of an aqueous slurry, homogeneously mixing throughout said slurry an absorbent slurry-insoluble and finely comminuted carrier impregnated with a slurry-insoluble liquid having a boiling point within the range of about 98° C. to 107° C., the weight ratio of carrier to slurry-insoluble liquid being approximately 0.67, molding said mixture and subjecting said molded mixture to gradually increasing steam temperatures and pressures up to approximately 130° C. and 25 p.s.i.g., maintaining said temperatures and pressures for a period of time sufficient to completely vaporize the included slurry-insoluble liquid and to preharden the slurry to a degree sufficient to entrap and retain the slurry-insoluble liquid vapors, and increasing the steam temperature to greater than approximately 170° C. to complete the induration.

References Cited in the file of this patent

UNITED STATES PATENTS

| | | |
|---|---|---|
| 1,829,381 | Walter | Oct. 27, 1931 |
| 1,932,971 | Hutteman | Oct. 31, 1933 |
| 2,232,588 | Camp | Feb. 18, 1941 |
| 2,282,190 | Jahjah | May 5, 1942 |
| 2,698,251 | Shea | Dec. 28, 1954 |